United States Patent Office 2,743,237
Patented Apr. 24, 1956

2,743,237

ZINC SULPHIDE PHOSPHOR CONTAINING ALUMINUM

Herman C. Froelich, Cleveland Heights, Ohio, assignor to General Electric Company, a corporation of New York No Drawing. Application August 29, 1952, Serial No. 307,177

6 Claims. (Cl. 252—301.6)

My invention relates to luminescent materials or phosphors, and more particularly to zinc sulphide phosphors and methods of preparation thereof.

It is an object of my invention to provide a copper-activated zinc sulphide phosphor which emits yellow or orange light.

The well known copper-activated zinc sulphide phosphors emit only two bands of varying intensity, namely, a blue band at about 4500 A and a green band at about 5200 A. It has been shown that in order that copper function as an activator, roughly equivalent amounts of either monovalent negative halide ions or of trivalent positive ions such as aluminum must be present in the phosphor. In either case, identical emission bands of identical intensity may be obtained, depending upon the copper content, and for copper concentrations of the usual amounts which are of the order of .001% to .01% Cu.

In accordance with the present invention, I have discovered that a new series of phosphors with yellow or orange emission may be prepared under the following conditions:

1. The molar amount of aluminum must at least equal and preferably exceed the molar amount of copper; a suitable range of molar ratios is Cu:Al=1:1 to 1:30 or higher, with an optimum in the range of 1:2 to 1:10.

2. The copper content must be considerably higher than is used for conventional phosphors; a suitable range is about .05% to 1.0% by weight of the ZnS, with an optimum around .3% Cu.

3. The firing must be carried out in an atmosphere of hydrogen sulphide at temperatures in the approximate range of 1000–1200° C., an optimum being in the vicinity of 1100° C.

The new phosphors are characterized by a light yellow to strong yellow body color without any grayness such as is known to discolor fired products of zinc sulphide and copper activator in high concentration. When excited by 3650 A radiation they emit yellow to orange light, depending upon both the copper and aluminum concentration. An increase in the concentration of either or both of these tends to deepen the color. When the aluminum concentration exceeds the mole ratio of 1:10, the brightness of the phosphors is reduced. Their body color remains yellow. When excited by cathode rays all the phosphors emit only the normal green and blue bands.

Phosphors prepared with copper activator and aluminum in amounts not exceeding the mole ratio of 1:1 give a medium bright to strong green electroluminescent response. Phosphors prepared with amounts of aluminum exceeding the mole ratio of 1:2 are either very dim or entirely non-responsive. The excess aluminum appears to act as a poison for electroluminescence.

While copper-activated zinc sulphide and zinc sulphide-oxide phosphors have been prepared with added copper contents of .5% or 1%, most of this copper does not enter the zinc sulphide lattice. The surplus may be removed easily by washing the materials with a solution of cyanide such as NaCN. The actual content of retained copper in washed phosphors is only a fraction of the amount added in the preparation. Unwashed phosphors are dark gray in color while washed ones are very much lighter. By contrast, the presence of aluminum, presumably in the form of $Al_2S_3$ or a solid solution of $ZnS-Al_2S_3$, appears to render a great deal more copper soluble in the base material. The copper is probably present in the form of $Cu_2S$ which is more stable at high temperatures than CuS. Thus a molar pair of $Al_2S_3$ and $Cu_2S$, consisting of four positive and four negative ions, can readily replace four ZnS "molecules" in the ZnS lattice.

The large increase in solubility of the $Cu_2S$ is responsible for the absence of grayness and for the yellow body color of the phosphors. Phosphors with as much as 1% Cu deepened to an olive body color which was not lightened by washing in NaCN, thus again indicating a complete solid solution of $Cu_2S$ in the zinc-aluminum sulphide base.

Typical examples of phosphors prepared in accordance with my invention are as follows:

I. 20 grams of pure zinc sulphide are moistened with an aqueous solution of copper nitrate containing .06 gram copper and with a solution of aluminum sulphate containing .41 gram of $Al_2(SO_4)_3$. After drying and sieving, the material is fired for ½ hour at 1100° C. in an atmosphere of $H_2S$. When cooled to room temperature in this atmosphere, the phosphor is a fine light yellow powder of yellow fluorescence. The material contains Cu and Al in a mole ratio of 1:2.5.

II. 20 grams of pure zinc sulphide are moistened with an aqueous solution of copper nitrate containing .06 gram of copper and with a solution of aluminum sulphate containing .87 gram of $Al_2(SO_4)_3$. After drying and sieving, the material is fired for ½ hour at 1100° C. in an atmosphere of $H_2S$. After cooling to room temperature in this atmosphere the phosphor is a fine yellow powder of orange fluorescence. The material contains Cu and Al in a mole ratio of 1:5.4.

The starting material for these phosphors need not be pure ZnS. Mixtures of ZnS and ZnO have given equally good results, the ZnO being converted into ZnS during the firing. In fact, phosphors may be prepared starting with pure ZnO and adjusting the firing cycle to first produce ZnS, and then the phosphor from it. Salts of copper other than the nitrate and salts of aluminum other than the sulphate may be used, as will be appreciated by those skilled in the art.

The light emission consists of at least two bands, the greener one of which predominates in intensity under cathode ray excitation, under increasing intensity of ultraviolet excitation, at decreasing temperatures of excitation, and in rate of decay. Emission curves of yellow and orange fluorescing ZnS:Al,Cu phosphors under 3650 A excitation show that with increasing concentration of Al and Cu the peak of emission is shifted from about 5100 A to 5800 A for the most orange phosphor measured. At the same time, the curves become much broader so that the half-width of the orange curves is about 40% greater than the half-width of the green curve. The curves of intermediate yellow colors cannot be built up additively from the green and orange curves alone.

The phosphors appear to be homogeneous. This is illustrated by the fact that both yellow and orange fluorescing powders retained their fluorescent colors until the last while they were being dissolved in, and thus destroyed by, strong mineral acid. Likewise, their bright green cathode ray response persisted in their remnants after most of the phosphor had been etched away by acid.

An analysis for retained copper content shows that phosphor prepared with a molar equivalent of Al in excess of that of copper retains all added copper in solid solution. Phosphor made with a molar deficiency of Al in terms of Cu contains copper which is removable by washing with NaCN. The amount of Cu retained by such washed phosphor was found to be equivalent to the amount of Al introduced. Only this phosphor gave an electroluminescent response, all others being practically non-responsive even though fired in pure $H_2S$.

Substitution of other trivalent elements in place of aluminum does not give the same results so far as the fluorescent response is concerned. While gallium, yttrium and indium produced yellow body colors and thus increased the solubility of $Cu_2S$ in ZnS like aluminum, only indium gave a somewhat deeper orange color with 3650 A excitation. Boron and lanthanum produced only slight modifications.

What I claim as new and desire to secure by Letters Patent of the United States is:

1. A copper-activated zinc sulphide phosphor having yellow and orange emission and containing aluminum in a molar ratio of Cu to Al in the range of about 1:1 to 1:30, the copper content being in the range of about .05% to 1% by weight of the zinc sulphide.

2. A copper-activated zinc sulphide phosphor having yellow and orange emission and containing aluminum in a molar ratio of Cu to Al in the range of about 1:2 to 1:10, the copper content being in the range of about .05% to 1% by weight of the zinc sulphide.

3. A copper-activated zinc sulphide phosphor having yellow and orange emission and containing aluminum in a molar ratio of Cu to Al in the range of about 1:2 to 1:10, the copper content being about .3% by weight of the zinc sulphide.

4. The method of preparing a zinc sulphide phosphor which comprises reacting zinc sulphide with copper and aluminum at a temperature in the approximate range of 1000–1200° C. and in an atmosphere of hydrogen sulphide, the copper content being in the range of about .05% to 1.0% by weight of the zinc sulphide, and the molar amount of aluminum with respect to copper being in the range of 1:1 to 30:1.

5. The method of preparing a zinc sulphide phosphor which comprises reacting zinc sulphide with copper and aluminum at a temperature in the approximate range of 1000–1200° C. and in an atmosphere of hydrogen sulphide, the copper content being in the range of about .05% to 1.0% by weight of the zinc sulphide, and the molar amount of aluminum with respect to copper being in the range of 2:1 to 10:1.

6. The method of preparing a zinc sulphide phosphor which comprises reacting zinc sulphide with copper and aluminum at a temperature in the approximate range of 1000–1200° C. and in an atmosphere of hydrogen sulphide, the copper content being in the range of about .3% by weight of the zinc sulphide, and the molar amount of aluminum with respect to copper being in the range of 2:1 to 10:1.

References Cited in the file of this patent

UNITED STATES PATENTS

| | | |
|---|---|---|
| 2,623,857 | Kroger | Dec. 30, 1952 |
| 2,623,858 | Kroger | Dec. 30, 1952 |
| 2,660,566 | Froelich | Nov. 24, 1953 |